Figure 1:
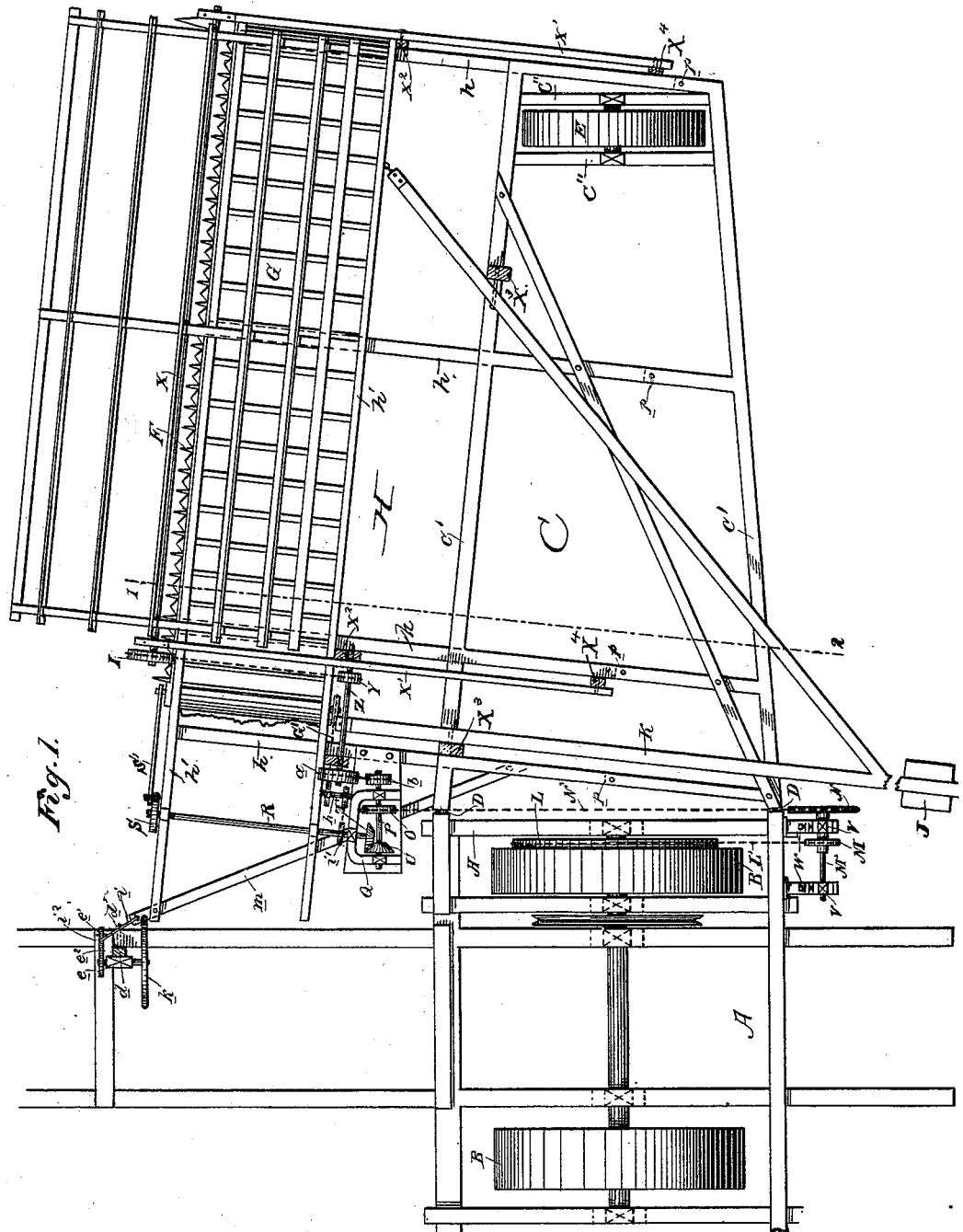

(No Model.) 4 Sheets—Sheet 1.

B. HOLT.
HEADER AND THRASHER.

No. 408,412. Patented Aug. 6, 1889.

Witnesses,
Geo. H. Strong
J. H. Nurse

Inventor,
Benj. Holt
By Dewey & Co.
attys

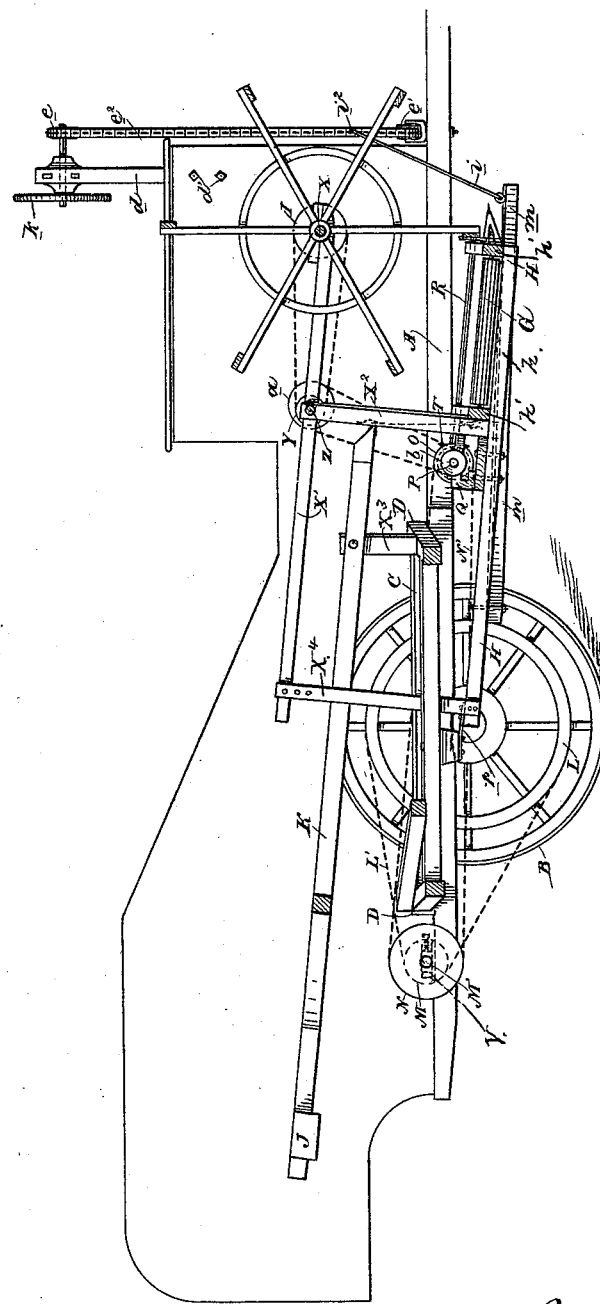

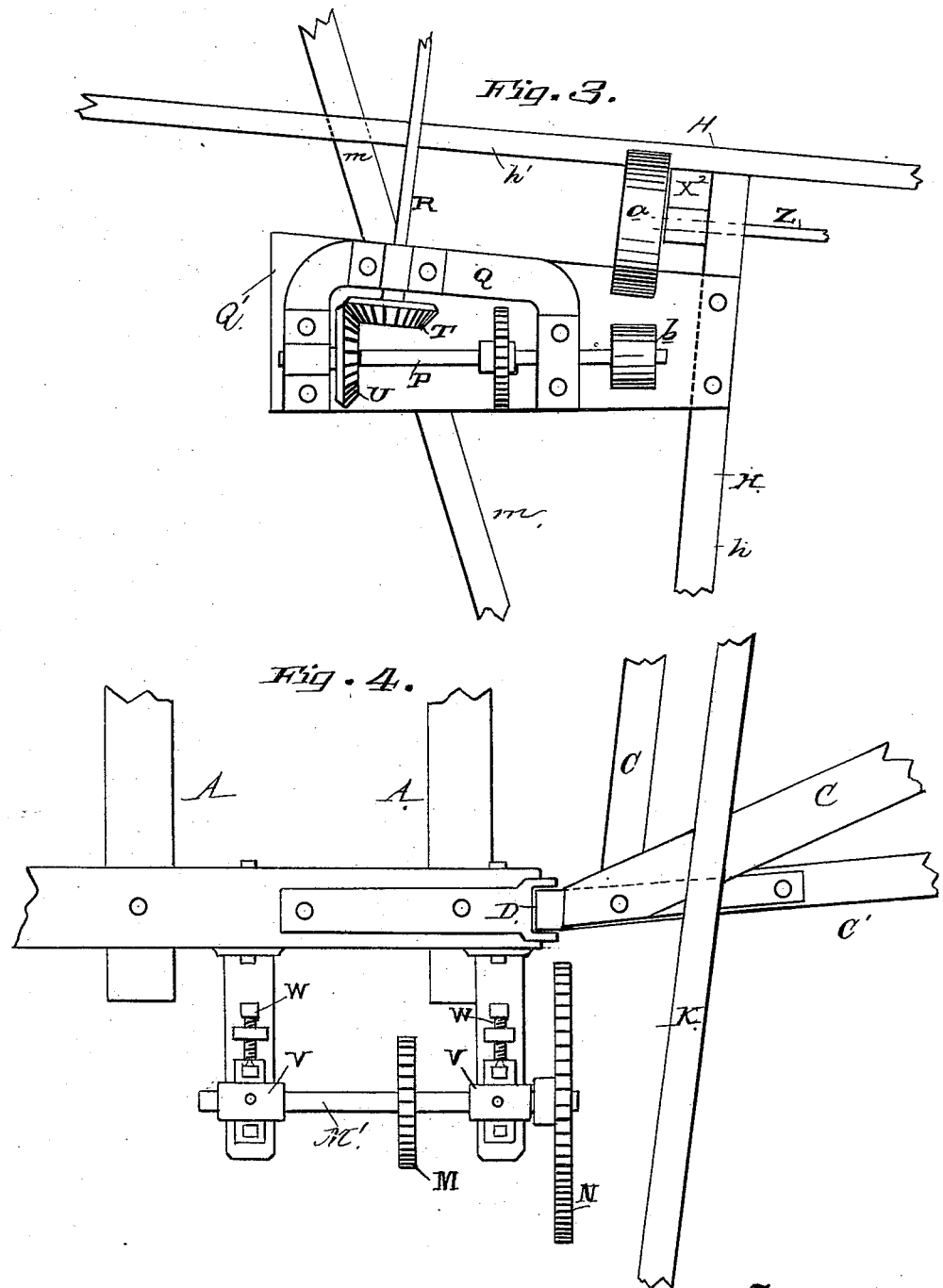

(No Model.) 4 Sheets—Sheet 4.
B. HOLT.
HEADER AND THRASHER.
No. 408,412. Patented Aug. 6, 1889.
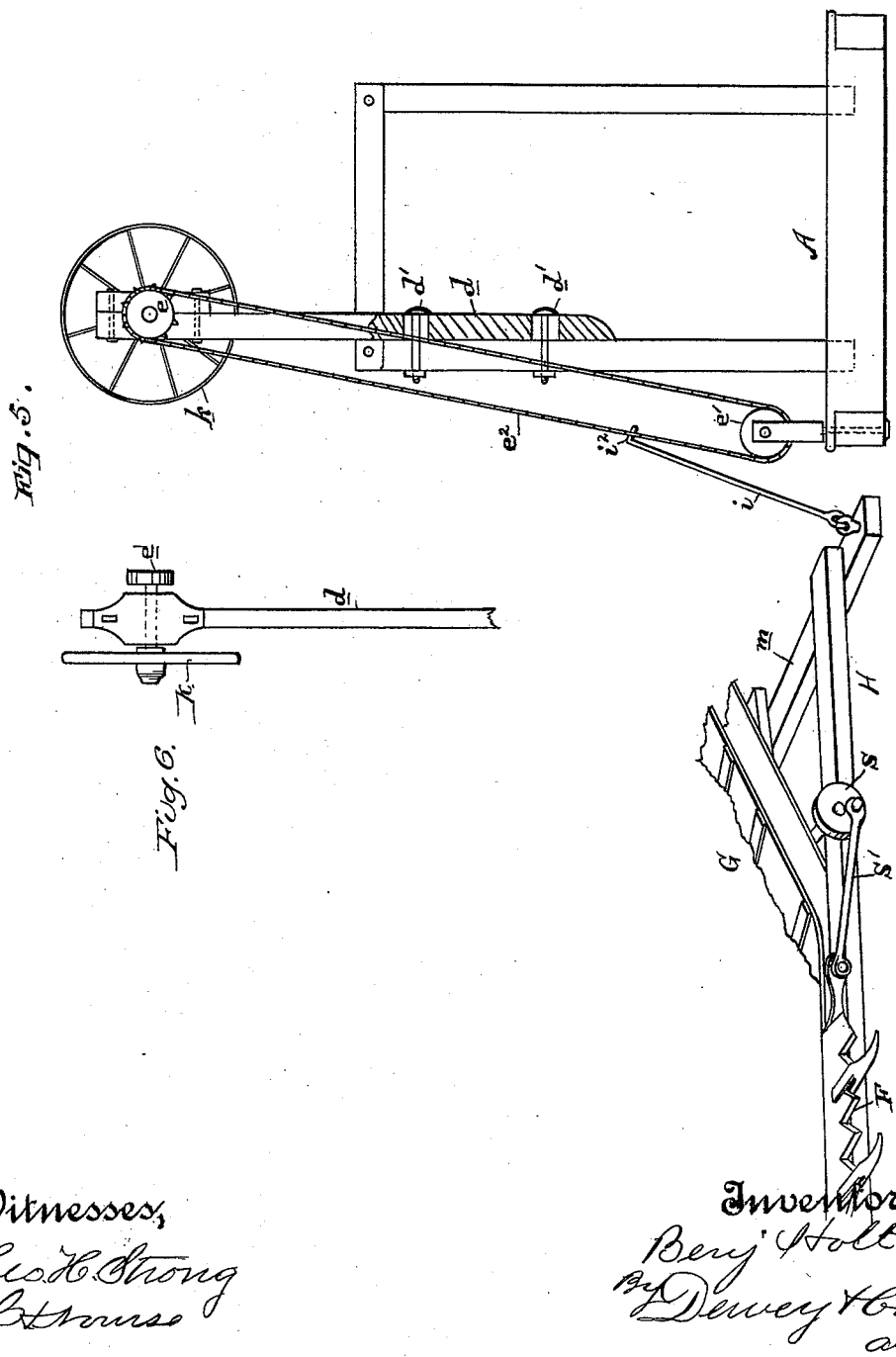

UNITED STATES PATENT OFFICE.

BENJAMIN HOLT, OF STOCKTON, CALIFORNIA.

HEADER AND THRASHER.

SPECIFICATION forming part of Letters Patent No. 408,412, dated August 6, 1889.

Application filed July 29, 1887. Serial No. 245,639. (No model.)

*To all whom it may concern:*

Be it known that I, BENJAMIN HOLT, of Stockton, county of San Joaquin, State of California, have invented an Improvement in Headers and Thrashers; and I hereby declare the following to be a full, clear, and exact description of the same.

My invention relates to certain improvements in combined headers and thrashers, the improvement being especially applicable to the header portion of the apparatus; and my invention consists in the constructions and combinations of devices, which I shall hereinafter fully describe and claim.

Figure 1 is a plan view of the machine. Fig. 2 is a sectional view on the line 2 2 of Fig. 1. Fig. 3 is an enlarged view of the driving-gear and adjacent parts. Fig. 4 is a view of the spocket-wheels behind the driving-wheels, together with their adjusting mechanism and adjacent parts. Fig. 5 is a side elevation showing particularly the slotted post $d$, the chain $e^2$, the sprocket pulleys or wheels, the link which engages the chain and diagonal bar $m$, and the sickle and means for driving it. Fig. 6 is a detail of the upper end of the post $d$, showing the band-wheel $k$ and chain pulley or wheel $e$.

A is a thrashing-machine frame mounted upon the driving and bearing wheels B B, the axle of which is journaled upon the frame A in the usual manner.

As my present invention more especially relates to the header portion of the apparatus, I have not shown the details of the thrasher.

The main frame C of the header has its inner end hinged to the side of the thrashing-frame A at the points D, and its timbers C′ converge from these points toward the outer end, where they are supported upon a wheel E, the axle of which is journaled upon the frame-timbers C″ at the outer end and in line with the axle or shaft of the wheels B B. This allows the outer end of the frame C to rise and fall independently of the thrashing-frame A, the hinged joints at the points D allowing the two frames to conform to each other's movements and to the irregularities of the surface of the ground over which the machine is traveling.

The supplemental frame H is similar to that of ordinary headers; and it consists of the timbers $h$, extending fore and aft and nearly in the line of travel of the machine and the timbers $h'$. In my present invention the timbers $h$ form a small angle with the line of travel, as shown in Fig. 1. These timbers pass beneath the fore-and-aft timbers of the frame C and are hinged thereto by any suitable form of hinge $p$, so that the front end of the frame H may be raised and depressed about these hinges and without reference to the transverse vertical movements of the frame C, to which they are hinged. The flat straps which form the hinges $p$ in the drawings are no part of my invention, but are shown as one method of uniting frames C and H.

The sickle or cutter F and the carrying belt or draper G are supported upon the front end of the supplemental frame H in the usual manner, and a reel-shaft X has its ends journaled in the front ends of timbers X′, which extend rearwardly and have their rear ends adjustably attached to posts $X^4$ on the timbers $h$ of the frame H, while near their centers they are pivoted to posts $X^2$ upon the frame H, so that the reel moves up and down in unison with the movements of the frame H and the sickle in the usual manner, these parts not being novel in this case.

It will be seen that the timbers of the header-frame C do not extend exactly at right angles and parallel with those of the frame A; but the front of the frame C has its outer end considerably in rear of the line drawn through its inner end parallel with the front timbers of the frame A. This is for the purpose of making the machine draw lighter, and also causing it to work better when turning corners.

As the mechanism and gearing for driving the sickle and also the reel-shaft are not parallel with or at right angles with the driving-wheels and machinery upon the main frame A, I employ a device for transmitting power from the driving-wheels B to these angularly-arranged parts, which I will now proceed to describe.

L is a sprocket or chain pulley or wheel fixed so as to turn with one of the main driving or bearing wheels B by being clamped to the side of the main driving-wheel spokes by bolts or by other convenient means. In line directly behind this wheel and in the rear of the transverse timbers of the main thrashing-frame A is a sprocket pulley or wheel M, fixed upon the shaft M', which is journaled in boxes V. These boxes are adjustable horizontally by means of screws W, by turning which the boxes may be moved so as to regulate the tension of the chain L', which passes over said sprocket-wheels L and M, and also the chain N'.

A chain pulley or wheel N is fixed upon the shaft M', and the chain N', passing around this wheel, extends forward parallel with the fore-and-aft timbers of the frame A and passes around a chain pulley or wheel O upon the shaft P, which is journaled in the frame Q parallel with the shaft of the wheels M and N, so that the chain N' will run freely between the wheels N and O.

As the parts upon the header which are to be driven from the shaft P do not stand either parallel with or at right angles with this shaft, it is necessary to change the direction of the motion slightly. For this reason I have made the frame Q, the said frame being supported upon a plate Q', bolted to one of the timbers of the frame H, as shown in Fig. 3, with its front side parallel with the front timbers of the header-frame, and the shaft R, having one end journaled in the frame Q and the other upon the front timbers of the frame H, carries a crank-wheel S, from which, by means of the pitman S', the sickle is driven in the usual manner.

As the shafts R and P do not stand exactly at right angles with each other, I make a special bevel-gear consisting of the wheels U and T, having such a pitch that they will mesh properly together, and power is thus transmitted from the shaft P to the shaft R. Upon the end of the reel-shaft X is a chain-pulley I, and the chain from this pulley passes backward around the pulley Y upon the shaft Z. These shafts all correspond in position with the position of the header-frame, as shown, but the shaft Z is not parallel with the shaft P, from which the power is transmitted. Upon the end of the shaft P is a chain-pulley $b$, and upon the end of the shaft Z is a chain-pulley $a$. As this pulley $a$ is situated considerably above the pulley $b$, as shown in Fig. 2, it is manifest that the chain which passes between these two may be slightly twisted, so as to transmit the power from pulley $b$ to pulley $a$ without difficulty, notwithstanding the fact that the shafts P and Z are not parallel. The carrying belt or draper G is driven by a chain G', which is driven through the medium of the chain-pulley, counter-shaft $h$, and a second chain from the pulley $i'$ upon the shaft R, as shown in Fig. 1.

The system of chains and pulleys shown as connecting shaft R with the carrying-belt is old and forms no part of my invention.

The supplemental rising and falling frame H of the header is counterbalanced by a weight J upon the rear end of the lever-arm K, which is fulcrumed to posts $X^3$ upon the header-frame C in the usual manner. A bar or timber $m$ has its rear end attached to the timbers of the hinged supplemental header-frame H and extends diagonally forward to a point near the front corner of the thrashing-machine.

A slotted post $d$ is secured to one of the vertical frame-timbers of the thrashing-machine frame by bolts $d'$. Upon the upper end of the vertical post or timber $d$ is a chain-wheel $e$, and upon the lower timbers of the frame is another chain-pulley $e'$, and around these two pulleys passes a chain $e^2$. To the end of the diagonal bar or timber $m$ a link $i$ is fixed by a staple or otherwise, and this link has a hook $i^2$ at its upper end, as shown, which engages with any desired link of the chain $e^2$. By means of the hand-wheel $k$ upon the shaft of the wheel $e$ the operator causes the chain $e^2$ to move up and down and carry with it, through the link $i$, the diagonal bar $m$, which thus serves to raise and lower the front of the supplemental frame H, and with it the sickle, so as to cut the high and the low grain.

I do not claim, broadly, the lifting mechanism as applied to headers generally, but claim my especial combination as herein shown.

Having thus described my invention, what I claim as new, and desire to secure by Letters Patent, is—

1. The thrashing-machine frame A, having a frame C hinged to one side in a line parallel to the line of travel of the machine, but having a rearwardly-inclined front timber, in combination with the pulley L, secured to one of the main driving-wheels, the shaft M' behind the pulley L, parallel to its axis, the pulley M on the shaft M', chain L', connecting pulleys L and M, the counter-shaft P on the forward part of the machine parallel to shaft M' and driven thereby, the shaft R at right angles to the front timber of the frame C, the bevel gear-wheels U and T between said shafts P and R, the sickle parallel to the front timber of the frame C, and the crank-wheel and pitman connecting the shaft R with the sickle, substantially as herein described.

2. In a combined header and thrasher, the header-frame C, hinged to the thrasher-frame and extending outwardly, with its front timber having a rearward inclination, the supplemental frame H, carrying the sickle and grain-belt and hinged to the frame C at right angles to its front timber, the reel mounted on a shaft parallel to said front timber, and the shaft Z, driving said reel-shaft and parallel thereto, in combination with the main driving-wheels, the shaft M behind said wheels, driven thereby and parallel to their axle, the shaft P in front of said driving-wheel, parallel to shaft M' and driven thereby, and the chain-and-pulley connection between shafts P and Z, substantially as herein described.

3. The thrashing-machine frame A, the header-frame C, hinged to it and extending outwardly therefrom, with the wheel E at the outer end, and the supplemental frame H, hinged to frame C on a line parallel with its front timber and carrying the sickle and grain belt or draper, in combination with the chain-pulleys $e$ and $e'$ and the chain $e^2$ upon the thrashing-machine frame, the diagonal bar $m$, extending beneath the timbers of the supplemental frame H, and the link $i$, connecting said bar with the chain $e^2$, substantially as herein described.

In witness whereof I have hereunto set my hand.

BENJAMIN HOLT.

Witnesses:
GEO. H. COWIE,
S. W. ELLIOTT.